(12) United States Patent
Dudar et al.

(10) Patent No.: US 8,973,558 B2
(45) Date of Patent: Mar. 10, 2015

(54) METHOD AND SYSTEM FOR FUEL VAPOR CONTROL

(75) Inventors: Aed Mohammad Dudar, Canton, MI (US); Robert Roy Jentz, Westland, MI (US); Timothy DeBastos, Royal Oak, MI (US); James Michael Kerns, Trenton, MI (US); Michael Igor Kluzner, Oak Park, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 1053 days.

(21) Appl. No.: 13/032,268

(22) Filed: Feb. 22, 2011

(65) Prior Publication Data

US 2012/0211087 A1    Aug. 23, 2012

(51) Int. Cl.
*F02M 33/02*   (2006.01)
*F02D 41/00*   (2006.01)

(52) U.S. Cl.
CPC .................................. *F02D 41/0032* (2013.01)
USPC ....................................... 123/519; 73/114.39

(58) Field of Classification Search
CPC ................................................ F02M 25/0809
USPC ....................................... 123/520; 73/114.39
See application file for complete search history.

(56) References Cited

U.S. PATENT DOCUMENTS

| 6,363,921 B1* | 4/2002 | Cook et al. ................... 123/520 |
| 6,837,224 B2 | 1/2005 | Kidokoro et al. |
| 6,988,396 B2* | 1/2006 | Matsubara et al. ........ 73/114.39 |
| 7,043,972 B2* | 5/2006 | Matsubara et al. ........ 73/114.39 |
| 8,056,540 B2* | 11/2011 | DeBastos et al. ............. 123/521 |
| 8,418,525 B2* | 4/2013 | Haag et al. ..................... 73/1.72 |

OTHER PUBLICATIONS

DeBastos, Timothy et al., "Method and System for Fuel Vapor Control," U.S. Appl. No. 12/790,790, filed May 28, 2010, 58 pages.
Pearce, Russell Randall et al., "Method and System for Fuel Vapor Control," U.S. Appl. No. 12/790,791, filed May 28, 2010, 58 pages.
DeBastos, Timothy et al., "Method and System for Fuel Vapor Control," U.S. Appl. No. 12/790,792, filed May 28, 2010, 58 pages.

* cited by examiner

*Primary Examiner* — Lindsay Low
*Assistant Examiner* — Robert Werner
(74) *Attorney, Agent, or Firm* — James Dottavio; Alleman Hall McCoy Russell & Tuttle LLP

(57) ABSTRACT

Methods and systems are provided for monitoring a fuel vapor recovery system including a fuel tank isolation valve coupled between a fuel tank and a canister. During selected conditions, the valve is modulated and pressure pulsations in the fuel vapor recovery system are monitored. Valve degradation is identified based on correlations between the valve modulation and the resultant pressure pulsations.

17 Claims, 7 Drawing Sheets

METHOD AND SYSTEM FOR FUEL VAPOR CONTROL

FIELD

The present application relates to fuel vapor purging in vehicles, such as hybrid vehicles.

BACKGROUND AND SUMMARY

Reduced engine operation times in hybrid vehicles, such as plug-in hybrid vehicles, enable fuel economy and reduced fuel emissions benefits. However, the shorter engine operation times can lead to insufficient purging of fuel vapors from the vehicle's emission control system. To address this issue, hybrid vehicles may include a fuel tank isolation valve (FTIV) between a fuel tank and a hydrocarbon canister of the emission system to limit the amount of fuel vapors absorbed in the canister. Specifically, the normally closed FTIV separates storage of refueling vapors from the storage of diurnal vapors, and is opened during refueling and purging to allow refueling vapors to be directed to the canister.

During leak detection operations, the FTIV is kept closed to better enable pressures and vacuums to be generated. Leaks are then detected based on pressure changes following FTIV closure. However, if the FTIV function is degraded, inaccurate leak detection may occur.

Thus in one example, the above issue may be at least partly addressed by a method of monitoring a fuel vapor recovery system. In one example embodiment, the method comprises, modulating a fuel tank isolation valve (FTIV) coupled between a fuel tank and a canister of the fuel vapor recovery system, and indicating FTIV degradation based on pressure pulsations upstream and/or downstream of the FTIV responsive to the modulation.

In one example, during a diurnal cycle, when the engine is off and a threshold pressure difference across the FTIV has been obtained, the valve may be modulated (that is, intermittently opened) with a duty cycle and frequency based on the bandwidth of the valve and the pressure differential across the FTIV. Corresponding pressure pulsations upstream and/or downstream of the valve may be estimated by pressure sensors coupled to the fuel tank and/or the canister. In one example, a frequency (or number of pulses) of the valve modulation may be compared to the frequency (or number of pulses) of the pressure pulsation. In response to a frequency ratio of pressure pulses to valve pulses being lower than a threshold, valve degradation may be indicated. In another example, the FTIV may be modulated with a selected frequency and valve degradation may be indicated based on the amplitude of the pressure pulsations at the selected frequency. For example, the pressure pulsation may be filtered, in parallel, through each of a band-pass filter and a notch filter. In response to a difference of the outputs (or amplitudes) from the two filters being lower than a threshold, valve degradation may be indicated. Further, to enable emissions compliance, in response to the indication of valve degradation, a leak detection operation may be disabled during a subsequent engine-on diurnal cycle.

In this way, pressure fluctuations across the FTIV may be correlated with a modulation of the valve to verify valve functionality. By confirming FTIV functionality before checking for systems leaks, emissions compliance may be better ensured.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
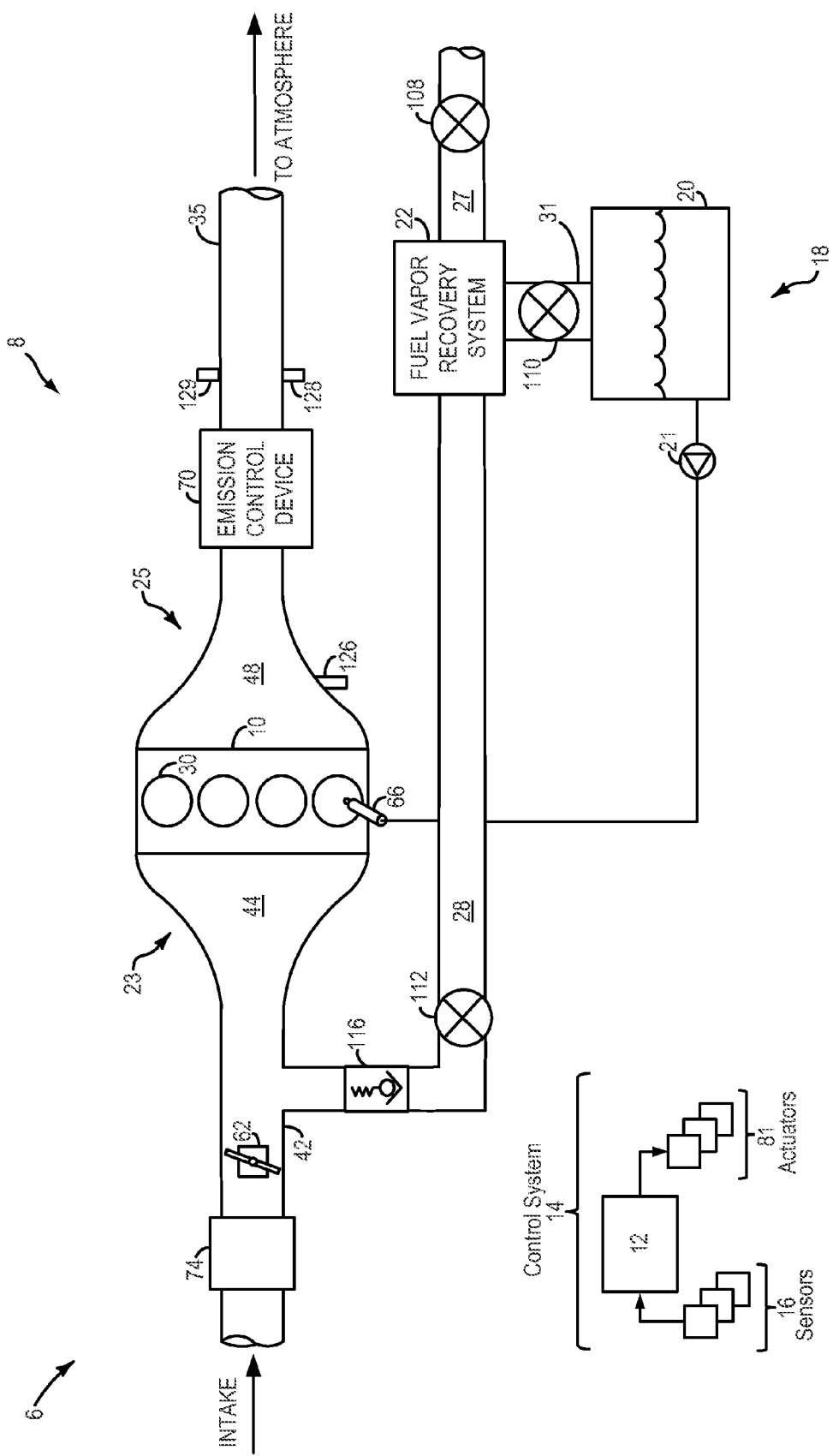
FIG. 1 shows a schematic depiction of an engine and an associated fuel vapor recovery system.
Figure 2:
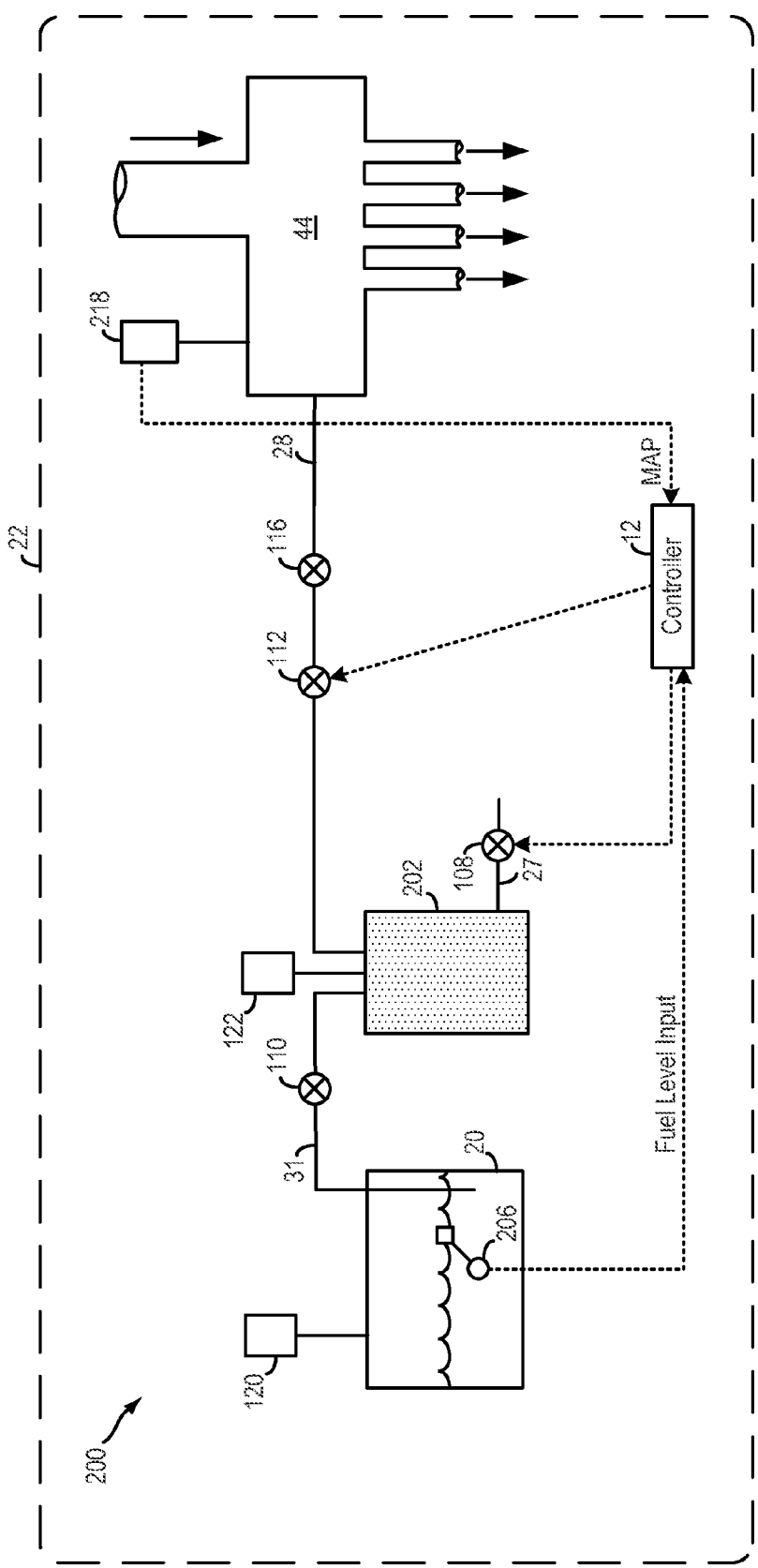
FIG. 2 shows an embodiment of the fuel vapor recovery system of FIG. 1.
Figure 7:
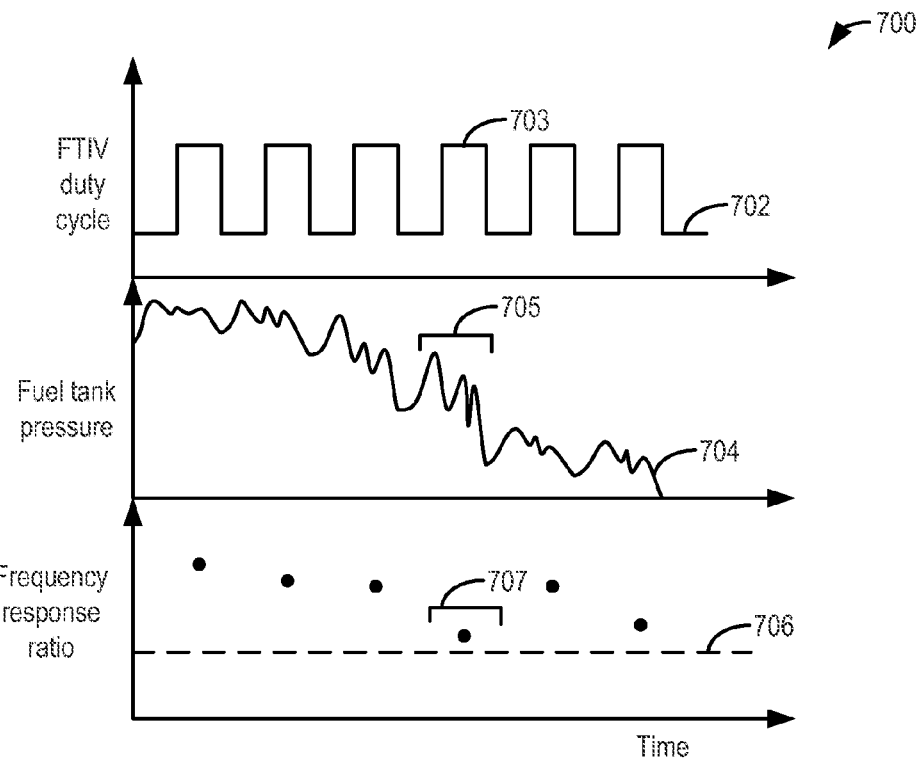
FIGS. 7-8 illustrate example maps for indicating FTIV degradation based on pressure pulsations.
Figure 8:
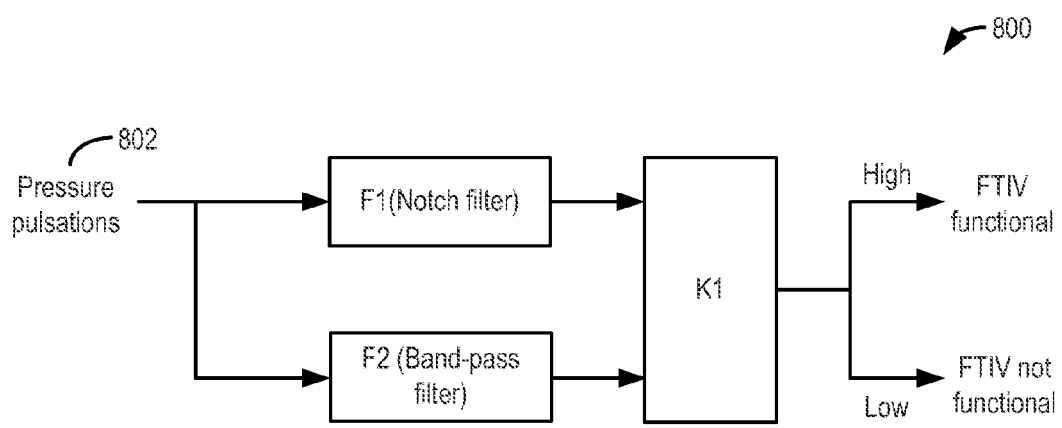

The following description relates to systems and methods for monitoring a fuel vapor recovery system, such as the system of FIG. 2, coupled to an engine system, such as the engine system of FIG. 1. During selected conditions, a fuel tank isolation valve (FTIV) of the fuel vapor recovery system may be modulated and pressure pulsations upstream and/or downstream of the valve may be monitored. Based on correlations between the valve modulation and the pressure pulsations, valve degradation may be indicated. Further, based on the functionality of the FTIV, fuel vapor recovery system operations (such as canister purging and leak detection) may be adjusted. An engine controller may be configured to perform diagnostic routines, such as those depicted in FIGS. 3-6, to identify valve degradation based on pressure pulsations responsive to the valve modulation, and to disable leak detection operations if the valve is degraded. Example maps that may be used to identify valve degradation are illustrated in FIGS. 7-8. In this way, by confirming that the FTIV is functional before performing a leak detection routine, the accuracy of leak detection may be increased, thereby improving emissions compliance.

FIG. 1 shows a schematic depiction of a hybrid vehicle system 6 that can derive propulsion power from engine system 8 and/or an on-board energy storage device (not shown), such as a battery system. An energy conversion device, such as a generator (not shown), may be operated to absorb energy from vehicle motion and/or engine operation, and then convert the absorbed energy to an energy form suitable for storage by the energy storage device.

Engine system 8 may include an engine 10 having a plurality of cylinders 30. Engine 10 includes an engine intake 23 and an engine exhaust 25. Engine intake 23 includes a throttle 62 fluidly coupled to the engine intake manifold 44 via an intake passage 42. Engine exhaust 25 includes an exhaust manifold 48 leading to an exhaust passage 35 that routes exhaust gas to the atmosphere. Engine exhaust 25 may include one or more emission control devices 70 mounted in a close-coupled position. The one or more emission control devices may include a three-way catalyst, lean NOx trap, diesel particulate filter, oxidation catalyst, etc. It will be appreciated that other components may be included in the engine such as a variety of valves and sensors, as further elaborated in the example embodiment of FIG. 2.

In some embodiments, engine intake 23 may further include a boosting device, such as a compressor 74. Compressor 74 may be configured to draw in intake air at atmospheric air pressure and boost it to a higher pressure. As such, the boosting device may be a compressor of a turbocharger, where the boosted air is introduced pre-throttle, or the compressor of a supercharger, where the throttle is positioned before the boosting device. Using the boosted intake air, a boosted engine operation may be performed.

Engine system 8 may be coupled to a fuel vapor recovery system 22 and a fuel system 18. Fuel system 18 may include a fuel tank 20 coupled to a fuel pump system 21. Fuel tank 20 may hold a plurality of fuel blends, including fuel with a range of alcohol concentrations, such as various gasoline-ethanol blends, including E10, E85, gasoline, etc., and combinations thereof. Fuel pump system 21 may include one or more pumps for pressurizing fuel delivered to the injectors of engine 10, such as example injector 66. While only a single injector 66 is shown, additional injectors are provided for each cylinder. It will be appreciated that fuel system 18 may be a return-less fuel system, a return fuel system, or various other types of fuel system. Vapors generated in fuel system 18 may be routed to fuel vapor recovery system 22, described further below, via conduit 31, before being purged to the engine intake 23.

Fuel vapor recovery system 22 may include one or more fuel vapor recovery devices, such as one or more canisters, filled with an appropriate adsorbent, for temporarily trapping fuel vapors (including vaporized hydrocarbons) generated during fuel tank refilling operations, as well as diurnal vapors. In one example, the adsorbent used is activated charcoal. When purging conditions are met (FIG. 6), such as when the canister is saturated, vapors stored in fuel vapor recovery system 22 may be purged to engine intake 23.

Fuel vapor recovery system 22 may further include a vent 27 which may route gases out of the recovery system 22 to the atmosphere when storing, or trapping, fuel vapors from fuel system 18. Vent 27 may also allow fresh air to be drawn into fuel vapor recovery system 22 when purging stored fuel vapors from fuel system 18 to engine intake 23 via purge line 28 and purge valve 112. A canister check valve 116 may also be included in purge line 28 to prevent (boosted) intake manifold pressure from flowing gases into the purge line in the reverse direction. While this example shows vent 27 communicating with fresh, unheated air, various modifications may also be used. Flow of air and vapors between fuel vapor recovery system 22 and the atmosphere may be regulated by the operation of a canister vent solenoid (not shown), coupled to canister vent valve 108. A detailed system configuration of fuel vapor recovery system 22 is described herein below with regard to FIG. 2, including various additional components that may be included in the intake, exhaust, and fuel system.

As such, hybrid vehicle system 6 may have reduced engine operation times due to the vehicle being powered by engine system 8 during some conditions, and by the energy storage device under other conditions. While the reduced engine operation times reduce overall carbon emissions from the vehicle, they may also lead to insufficient purging of fuel vapors from the vehicle's emission control system. To address this, a fuel tank isolation valve (FTIV) 110 is included in conduit 31, between fuel tank 20 and fuel vapor recovery system 22. FTIV 110 may be kept normally closed to limit the amount of fuel vapors absorbed in the canister from the fuel tank. Specifically, the normally closed FTIV separates storage of refueling vapors from the storage of diurnal vapors, and is opened during refueling and purging to allow refueling vapors to be directed to the canister. In one example, the normally closed FTIV is opened only during refueling and purging to allow refueling vapors to be directed to the canister. Further, in one example, FTIV 110 may be a solenoid valve and operation of FTIV 110 may be regulated by adjusting a driving signal to the dedicated solenoid (not shown).

One or more pressure sensors (FIG. 2) may be included upstream and/or downstream of FTIV 110 to provide an estimate of a fuel tank pressure and/or canister pressure, as well as for engine-off leak detection. As elaborated in FIG. 4, during selected conditions, FTIV 110 may be modulated, that is intermittently opened with a duty cycle, and pressure pulsations may be estimated by the one or more pressure sensors upstream and/or downstream of FTIV 110. The duty cycle selected for the modulation may be based on the bandwidth of the FTIV, as well as based on pressure differentials across the FTIV. Based on a comparison of the FTIV modulation with the pressure pulsations, FTIV functionality may be determined. In one example, as elaborated with reference to FIG. 7, FTIV degradation may be determined based on a frequency ratio of pressure pulse to valve pulses. In another example, as elaborated with reference to FIG. 8, the FTIV may be modulated at a selected frequency, and FTIV degradation may be based on an amplitude of the pressure pulsations at the selected frequency.

Vehicle system 6 may further include control system 14. Control system 14 is shown receiving information from a plurality of sensors 16 (various examples of which are described herein) and sending control signals to a plurality of actuators 81 (various examples of which are described herein). As one example, sensors 16 may include exhaust gas sensor 126 located upstream of the emission control device, temperature sensor 128, and pressure sensor 129. Other sensors such as additional pressure, temperature, air/fuel ratio, and composition sensors may be coupled to various locations in the vehicle system 6, as discussed in more detail herein. As another example, the actuators may include fuel injector 66, FTIV 110, purge valve 112, vent valve 108, and throttle 62. The control system 14 may include a controller 12. The controller may receive input data from the various sensors, process the input data, and trigger the actuators in response to the processed input data based on instruction or code programmed therein corresponding to one or more routines. Example control routines are described herein with regard to FIGS. 3-6.

FIG. 2 shows an example embodiment 200 of fuel vapor recovery system 22. Fuel vapor recovery system 22 may include one or more fuel vapor retaining devices, such as fuel vapor canister 202. Canister 202 may receive fuel vapors from fuel tank 20 through conduit 31. During normal engine operation, FTIV 110 may be kept closed to limit the amount of diurnal vapors directed to canister 202 from fuel tank 20. During refueling operations, and selected purging conditions, FTIV 110 may be temporarily opened to direct fuel vapors from the fuel tank to canister 202. While the depicted example shows FTIV 110 positioned along conduit 31, in alternate embodiments, the tank isolation valve may be mounted on the fuel tank.

A first pressure sensor 120 may be positioned upstream of FTIV 110, for example coupled to fuel tank 20 (as shown), or positioned along conduit 31 between fuel tank 20 and FTIV 110, to provide an estimate of fuel tank pressure. A second pressure sensor 122 may be positioned downstream of FTIV 110, for example coupled to canister 202 (as shown), or positioned along conduit 31 between FTIV 110 and canister 202, to provide an estimate of canister pressure.

A fuel level sensor 206 located in fuel tank 20 may provide an indication of the fuel level ("Fuel Level Input") to controller 12. As depicted, fuel level sensor 206 may comprise a float connected to a variable resistor. Alternatively, other types of fuel level sensors may be used. In one example, fuel tank 20 may further include an optional pressure relief valve.

Canister 202 may communicate with the atmosphere through vent 27. Canister vent valve 108, located along vent 27, may adjust flow of air and vapors between fuel vapor recovery system 22 and the atmosphere. Operation of the canister vent valve 108 may be regulated by a canister vent solenoid (not shown). In one example, during a fuel vapor storing operation (for example, during fuel tank refilling and while the engine is not running), the canister vent valve may be opened so that air, stripped of fuel vapor after having passed through the canister, can be pushed out to the atmosphere. In another example, during a purging operation (for example, during canister regeneration and while the engine is running), the canister vent valve may be opened to allow a flow of fresh air to strip the stored vapors of the activated charcoal.

Fuel vapors released from canister 202, for example during a purging operation, may be directed into intake manifold 44 via purge line 28. The flow of vapors along purge line 28 may be regulated by canister purge valve 112, coupled between the fuel vapor canister and the engine intake. In one example, canister purge valve 112 may be a ball check valve, although alternative check valves may also be used. The quantity and rate of vapors released by the canister purge valve may be determined by the duty cycle of an associated canister purge valve solenoid (not shown). As such, the duty cycle of the canister purge valve solenoid may be determined by the vehicle's powertrain control module (PCM), such as controller 12, responsive to engine operating conditions, including, for example, an air-fuel ratio. By commanding the canister purge valve to be closed, the controller may seal the fuel vapor recovery system from the engine intake.

An optional canister check valve 116 may also be included in purge line 28 to prevent intake manifold pressure from flowing gases in the opposite direction of the purge flow. As such, the check valve may be necessary if the canister purge valve control is not accurately timed or the canister purge valve itself can be forced open by a high intake manifold pressure. An estimate of the manifold absolute pressure (MAP) may be obtained from MAP sensor 218 coupled to intake manifold 44, and communicated with controller 12. Alternatively, MAP may be inferred from alternate engine operating conditions, such as a manifold air flow (MAF), as measured by a MAF sensor (not shown) coupled to the intake manifold. While the depicted example shows the canister check valve positioned between the canister purge valve and the intake manifold, in alternate embodiments, the check valve may be positioned before the purge valve.

One or more of pressure sensors 120, 122 may be used to identify leaks in the fuel vapor recovery system 22. Specifically, engine-off natural vacuum (EONV) leak detection may be enabled by observing changes in a pressure value of one or more of pressure sensors 120, 122 (for example, based on a failure to hold a vacuum). During leak detection (FIG. 5), an engine controller may be configured to monitor the presence of a vacuum in the sealed fuel tank after engine shut-off by monitoring the pressure change across the sensors. A drop in pressure, or vacuum, may occur as the fuel cools down over several minutes following engine shut-off. In one example, if a vacuum can be drawn, the system has no leaks. In contrast, if a vacuum cannot be drawn, a leak may be present.

As such, a functional FTIV 110 is required to enable accurate leak detection. Thus, during selected conditions, an engine controller may be configured to confirm FTIV operation (FIG. 4) during a first diurnal cycle before enabling leak detection during a second diurnal cycle immediately the following the first diurnal cycle.

The fuel vapor recovery system 22 may be operated by controller 12 in a plurality of modes by selective adjustment of the various valves and solenoids. For example, the following operating modes may be performed:

MODE A: Fuel Vapor Storage

During select engine and/or vehicle operating conditions, such as during a fuel tank filling operation and with the engine not running, the controller 12 may open FTIV 110, and canister vent valve (CVV) 108 while closing the canister purge valve (CPV) 112 to direct fuel vapors into canister 202 while preventing fuel vapors from being directed into the intake manifold.

MODE B: Canister Purging

During select engine and/or vehicle operating conditions, such as after an emission control device light-off temperature has been attained and with the engine running, the controller 12 may open canister vent valve 108 and canister purge valve 112 while closing FTIV 110. In this way, the vacuum generated by the intake manifold of the operating engine may be used to draw fresh air through vent 27 and through fuel vapor canister 202 to purge the stored fuel vapors into intake manifold 44. In this mode, the purged fuel vapors from the canister are combusted in the engine.

In yet another embodiment, rather than using fresh air that is at atmospheric pressure, compressed air that has been passed through a boosting device (such as a turbocharger or a supercharger) may be used for a boosted purging operation. As such, fuel vapor recovery system 22 may require additional conduits and valves for enabling a boosted purging operation.

During purging, the learned vapor amount/concentration can be used to determine the amount of fuel vapors stored in the canister, and then, during a later portion of the purging operation (when the canister is sufficiently purged or empty), the learned vapor amount/concentration can be used to estimate a loading state of the fuel vapor canister. In one example, based on the amount of fuel vapors purged from the canister to the intake, a corresponding amount of fuel vapors (e.g. diurnal vapors) may be bled from the fuel tank to the canister by opening the FTIV for a duration while keeping the CPV closed for the same duration.

Figure 3:
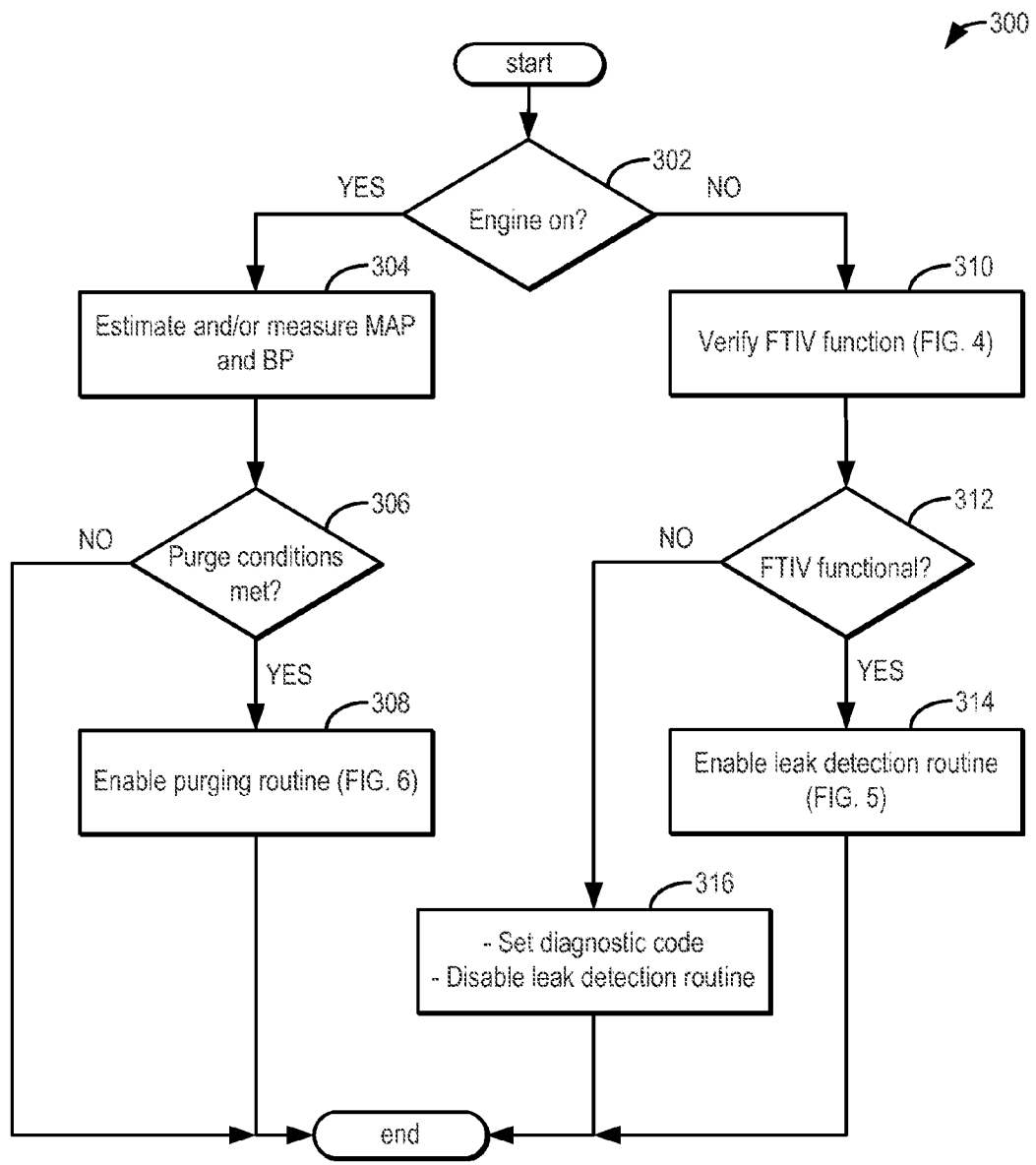
FIG. 3 shows a high level flow chart illustrating a routine for operating the fuel vapor recovery system of FIG. 1.

Now turning to FIG. 3, an example routine 300 is described for coordinating various fuel vapor recovery system operations based on vehicle operating conditions.

At 302, it may be determined whether the vehicle is on and the engine is running. As such, purging operations may be performed only if the engine is running, while leak detection operations may be performed only if the engine is not running. If the engine is running, then at 304, engine operating conditions may be estimated and/or measured. These may include, for example, engine speed, manifold pressure (MAP), barometric pressure (BP), catalyst temperature, canister load, etc. At 306, purge conditions may be confirmed. As such, purging may be confirmed based on various engine and vehicle operating parameters, including the amount of hydrocarbons stored in the canister 202 (such as the amount of hydrocarbons stored in the canister being greater than a threshold), the temperature of the emission control device 70 (such as the temperature being greater than a threshold), fuel temperature, the number of starts since the last purge (such as the number of starts being greater than a threshold), fuel properties (such as the alcohol amount in the combusted fuel, the frequency of purging increased as an alcohol amount in the fuel increases), and various others. In another example, purge conditions may be confirmed if the controller determines that fuel vapors were directed to the canister during a preceding engine cycle. If purging conditions are not confirmed, the routine may end. If confirmed, at 308, a purging routine, elaborated in FIG. 6, may be enabled.

If the engine is not on (at 302), then at 310, before performing a leak-detection operation (elaborated at FIG. 5), FTIV function may be verified. As elaborated in FIG. 4, verifying FTIV function includes modulating the FTIV and monitoring corresponding pressure pulsations upstream and/or downstream of the FTIV. At 312, it may be confirmed whether the FTIV is functional before the leak detection routine is enabled at 314. In comparison, if the FTIV is degraded, a diagnostic code may be set and the leak detection routine may be disabled for a duration. In one example, during a first engine-off diurnal cycle, FTIV function may be verified, and if FTIV degradation is determined, than during a second, subsequent engine-off diurnal cycle, leak detection may be disabled.

Figure 4:
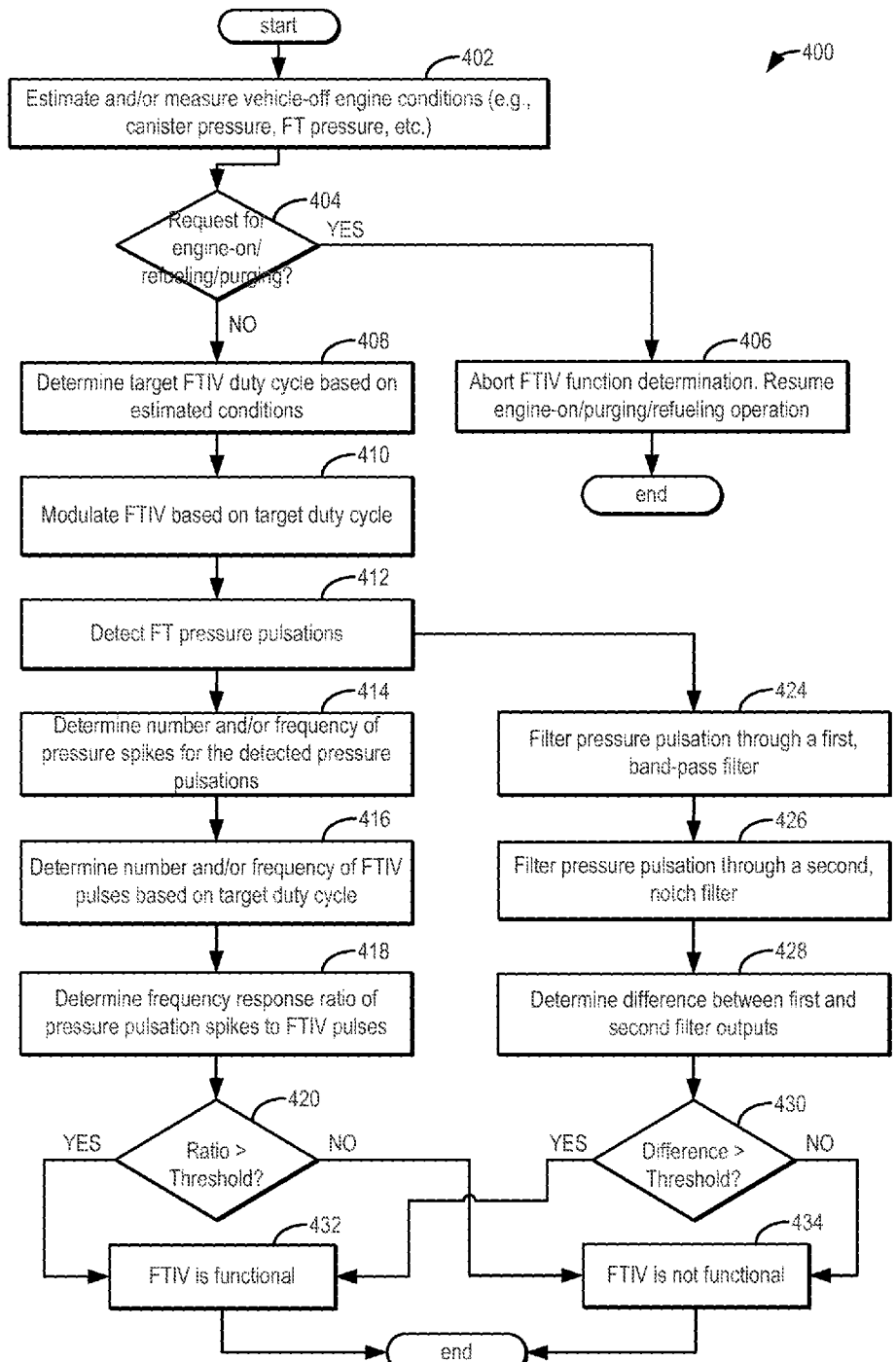
FIG. 4 shows a high level flow chart illustrating a routine for determining FTIV functionality in the fuel vapor recovery system of FIG. 1.

Now turning to FIG. 4, an example routine 400 for determining whether or not the FTIV is degraded is described. As such, the routine of FIG. 4 may be performed during selected engine-off conditions before a leak-detection operation is enabled to improve the accuracy of leak determination.

At 402, engine-off operating conditions may be determined. These may include, for example, a fuel tank pressure (or a pressure upstream of the FTIV) as estimated by a first pressure sensor coupled to the fuel tank (or coupled between the FTIV and the fuel tank), a canister pressure (or a pressure downstream of the FTIV) as estimated by a second pressure sensor coupled to the canister (or coupled between the FTIV and the canister), as well as a pressure difference across the FTIV. In one example, FTIV modulation (that is, the FTIV function determination routine) may be performed during an engine-off condition in response to obtaining a threshold pressure difference across the FTIV. As elaborated herein, the pressure difference across the FTIV may determine the duty cycle of the modulation.

At 404, it may be determined whether any requests for turning the engine-on, refueling the fuel tank, and/or purging the canister have been received. If yes, then at 406, the routine includes aborting or stopping the modulation in response to the request and initiating an engine restart, fuel tank refueling, or canister purging, based on the request.

If no request has been received, then at 408, valve modulation is selected. The valve modulation may include periodic modulation of the FTIV valve opening, spanning from a fully opened position, across the full range of open positions, to a fully closed position, or partially there-between. The modulation may include intermittently opening of the FTIV with a duty cycle based on a bandwidth of the valve. Specifically, a periodic frequency of the duty cycle may be selected based upon conditions, such as FTIV temperature, so as to be within the bandwidth of the FTIV. Further, a target FTIV duty cycle percentage may be determined based on the estimated conditions. For example, the duty cycle may be adjusted based on the pressure difference across the FTIV. As such, if the pressure difference across the FTIV is relatively low, a higher duty cycle may result in rapid pressure equalization across the FTIV. Consequently, a quantifiable pressure pulse corresponding to the valve modulation may not be properly estimated. Thus, in one example, a decreased modulation duty cycle (or lower duty cycle) may be applied during lower pressure differential conditions, while an increased modulation duty cycle (or higher duty cycle) may be applied during higher pressure differential conditions. In another example, the amplitude of the FTIV modulation may be made smaller when the pressure difference is higher, while the amplitude may be made larger when the pressure difference is lower. As such, the frequency of the duty cycle is defined by the duration between consecutive valve pulses while the duty cycle modulation (or amplitude of the duty cycle) is defined by the duration, within a pulse, for which the valve is open. Thus, for example, a 30% duty cycle at a high frequency may result in the valve being roughly 30% open, while a 30% duty cycle at a frequency within the bandwidth of the wave may correspond to the valve being 100% open for 30% of the cycle. In one example, the duty cycle details (frequency, amplitude, etc.) for FTIV modulation at different conditions may be predetermined and stored in a look-up table.

At 410, the routine includes modulating (that is, intermittently opening or pulsing) the FTIV with the target duty cycle at the selected frequency. At 412, pressure pulsations generated upstream and/or downstream of the FTIV in response to the FTIV modulation may be detected, wherein the pulsations include pulsations at the same frequency as the FTIV modulation frequency. In one example, during a first condition when the pressure difference across the FTIV is higher, pressure pulsations only upstream or only downstream of the FTIV may be estimated. In comparison, during another condition, when the pressure difference across the FTIV is lower, pressure pulsations upstream and downstream of the FTIV may be estimated. Based on the estimated pressure pulsations, FTIV degradation may be indicated.

At 414-434, FTIV degradation may be determined based on the estimated pressure pulsations. In one example, as elaborated at 414-420, FTIV degradation may be indicated based on a frequency ratio of the pressure pulses to the valve pulses. In another example, as elaborated at 424-430, the FTIV is periodically modulated at a selected frequency, and FTIV degradation is indicated based on the amplitude of the pressure pulsations at the selected frequency. For example, FTIV degradation may be indicated based the output of the pressure pulsations through one or more filters.

Turning now to the former approach (ratio-based approach), at 414, the routine includes determining a number and/or frequency of pressure pulses, or spikes, from the estimated pressure pulsations. In one example, pressure spikes may be determined by calculating the derivative of the pressure pulsations. At 416, the number and/or frequency of the FTIV pulses may be determined based on the duty cycle of the valve modulation. At 418, a frequency response ratio of the pressure pulses to the valve pulses may be determined. At 420, it may be determined whether the ratio is greater than a threshold. If the ratio is higher than the threshold, then at 432, it may be determined that the FTIV is functioning properly. If the frequency ratio is lower than the threshold, then at 434, FTIV degradation may be indicated, for example, by setting a diagnostic code.

FIG. 7 graphically illustrates the ratio-based approach wherein FTIV degradation is determined based on the frequency response ratio of the FTIV modulation to the pressure pulsation. As such, this is the approach elaborated at 414-420 in FIG. 4.

Map 700 of FIG. 7 depicts the modulation of the FTIV (FTIV duty cycle) at graph 702, and the corresponding pressure pulsations (herein based on the fuel tank pressure) at graph 704. A frequency response ratio for each pulse is illustrated at graph 706. In the depicted example, the FTIV is modulated with a duty cycle frequency based on the bandwidth of the valve. The modulation is performed during an engine-off condition when the pressure difference (at the onset of the modulation) across the FTIV is higher than a predetermined threshold. As such, during the modulation, a canister purge valve of the fuel vapor recovery system (of FIGS. 1-2) is kept closed while the canister vent valve is kept open. In the depicted example, at the onset of the modulation, a positive (or higher) pressure is present on the fuel tank side of the FTIV as compared to the canister side of the FTIV. As the FTIV is modulated (graph 702), or intermittently opened, fuel vapors are diverted across the FTIV from the fuel tank side to the canister side. Thus, with every FTIV pulse, a pressure pulse (herein, a pressure drop) is estimated at the fuel tank and the fuel tank pressure is gradually dissipated (graph 702). A controller may be configured to determine a pressure spike for each pressure pulsation, for example, based on the derivative of the pressure pulsation, and then calculate a frequency response ratio. As one example, a frequency response ratio 707 may be calculated for a pressure pulse 705 responsive to an FTIV modulation 703. The frequency response ratio may then be compared to a threshold ratio 706. If the frequency response ratio is above the threshold 706 (as is the case in the depicted example), the controller may determine that the FTIV is functional and not degraded.

It will be appreciated that while the depicted example shows pressure pulsations wherein the pressure upstream of the FTIV is initially a positive pressure that drops over the period of the pressure pulsations, in alternate examples, based on the vehicle operating conditions, the pressure upstream of the FTIV may initially be a negative pressure that rises over the period of the pressure pulsations. Also, while the depicted example shows pressure pulsations upstream of the FTIV, pressure pulsations downstream of the FTIV may optionally, or additionally, be monitored. For example, when the pressure upstream of the FTIV is positive, the controller may monitor pressure pulsations of a decreasing pressure profile upstream of the FTIV and/or pressure pulsations of an increasing pressure profile downstream of the FTIV. Alternatively, when the pressure downstream of the FTIV is positive, the controller may monitor pressure pulsations of a decreasing pressure profile downstream of the FTIV and/or pressure pulsations of an increasing pressure profile upstream of the FTIV.

Returning to FIG. 4, and turning now to the latter, filter-based approach, at 424, the routine includes filtering the pressure pulsations through a first band-pass filter. At 426, the routine includes filtering the pressure pulsations through a second notch filter. At 428, a difference between the outputs from the first filter and the second filter may be determined. At 430, it may be determined whether the difference between the filter outputs is greater than a threshold. If the difference between the filter outputs is greater than the threshold, no valve degradation may be determined at 432. If the difference between the filter outputs is less than the threshold, valve degradation may be indicated at 434, for example, by setting a diagnostic code.

It will be appreciated that while the depicted example compares the outputs from a band-pass filter and a notch filter, in alternate examples, other appropriate filters may be used. Further, while the depicted example uses two filters, a larger, or fewer, number of filters may be alternatively used.

Map 800 of FIG. 8 graphically illustrates an example of the filter-based approach wherein FTIV degradation is determined based on the outputs of the pressure pulsation through a band-pass filter and a notch filter, as elaborated at 424-430 in FIG. 4. Pressure pulsations 802 responsive to each FTIV modulation may be filtered, in parallel, through a first filter F1 (herein a notch filter), and a second filter F2 (herein a band-pass filter). The outputs from the two filters may then be compared by a comparator (K1). If the result from the comparator is higher than a threshold, then it may be determined that the FTIV is functional. In comparison, if the result from the comparator is lower than the threshold, then it may be determined that the FTIV is not functional.

As such, based on operating conditions, one or more of the pressure pulsation processing approaches may be used. In one example, when the pressure difference across the FTIV is higher, either the filter-based approach or the ratio-based approach may be used. In another example, when the pressure difference across the FTIV is lower, both approaches may be used, and FTIV degradation may be confirmed based on the result from both approaches.

As elaborated in FIG. 3, in response to the indication of FTIV degradation, leak detection may be disabled in the fuel vapor recovery system for a duration. By disabling leak detection based on the functional status of the FTIV, the accuracy of leak detection can be improved, and emissions compliance can be achieved.

Figure 5:
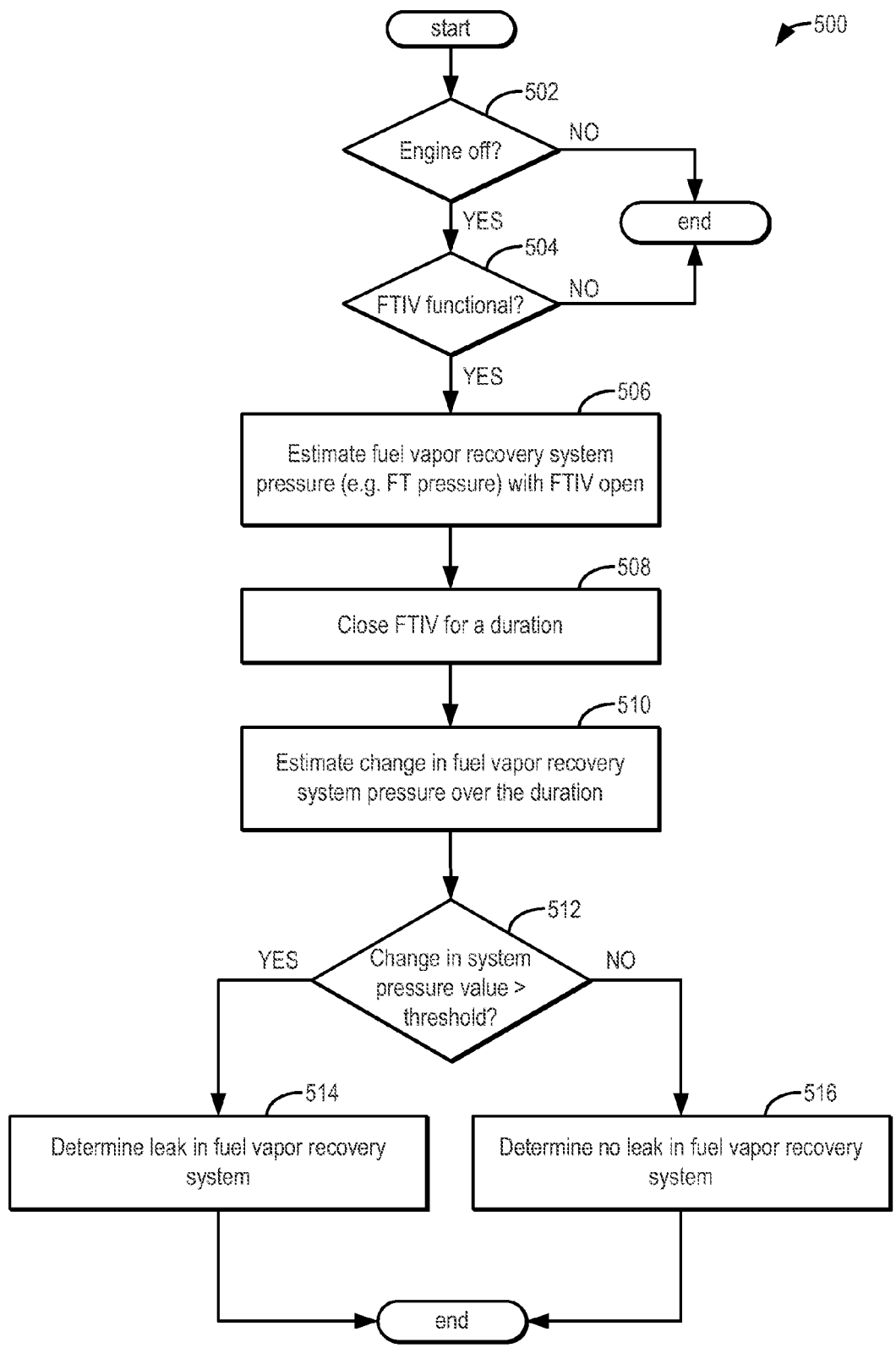
FIG. 5 shows a high level flow chart illustrating a leak detection routine for the fuel vapor recovery system of FIG. 1.

Now turning to FIG. 5, an example routine 500 is shown for performing a leak detection operation in the fuel vapor recovery system of FIG. 1. As such, the routine of FIG. 5 may be performed during a second engine-off diurnal cycle immediately following a first engine-off diurnal cycle wherein FTIV functionality has been confirmed.

At 502, engine-off conditions may be confirmed. At 504, it may be confirmed that the FTIV is functional. At 506, upon confirmation of both conditions, a fuel vapor recovery system pressure may be estimated. In the depicted example, a fuel tank pressure may be estimated by a first pressure sensor coupled to the fuel tank or coupled between the fuel tank and the FTIV. As such, the fuel tank pressure may be estimated with the FTIV open, but with the canister vent valve and the canister purge valves closed. Optionally, a temperature at the fuel tank may also be estimated.

At 508, if the estimated fuel tank pressure (and temperature) is within a desired range, the FTIV may be closed for a short duration, thereby sealing the system from the engine intake and the atmosphere. For example, the FTIV may be closed when a desired amount of positive pressure or vacuum is obtained in the fuel tank. At 510, a change in the fuel tank pressure value may be estimated over the duration of FTIV closure. At 512, it may be determined whether a change in the fuel tank pressure value is greater than a threshold. In one example, the absolute change in fuel tank pressure over the duration of FTIV closure may be compared to the threshold. In another example, a rate of change in the fuel tank pressure over the duration may be compared to the threshold. If the change in fuel tank pressure value is greater than the threshold, at 514, it may be determined that there is a leak in the fuel vapor recovery system (herein, in the fuel tank). In comparison, if the change in fuel tank pressure value is lower than the threshold, at 516, no leak may be determined.

It will be appreciated that the routine of FIG. 5 represents one example leak detection routine, and that alternate leak detection routines may be possible. For example, in alternate embodiments, the canister purge valve and FTIV may be opened for a duration to draw a desired amount of vacuum into the fuel tank before the valves are closed and a change in the fuel tank pressure is observed. In still other embodiments, leak detection may be based on each of a change in temperature and pressure value at the fuel tank. For example, no leak may be determined if a rate of change in the fuel tank pressure is within a threshold value of the rate of change in the fuel tank temperature. In still further examples, leak detection may be based on a fuel tank pressure as well as a canister pressure.

Figure 6:
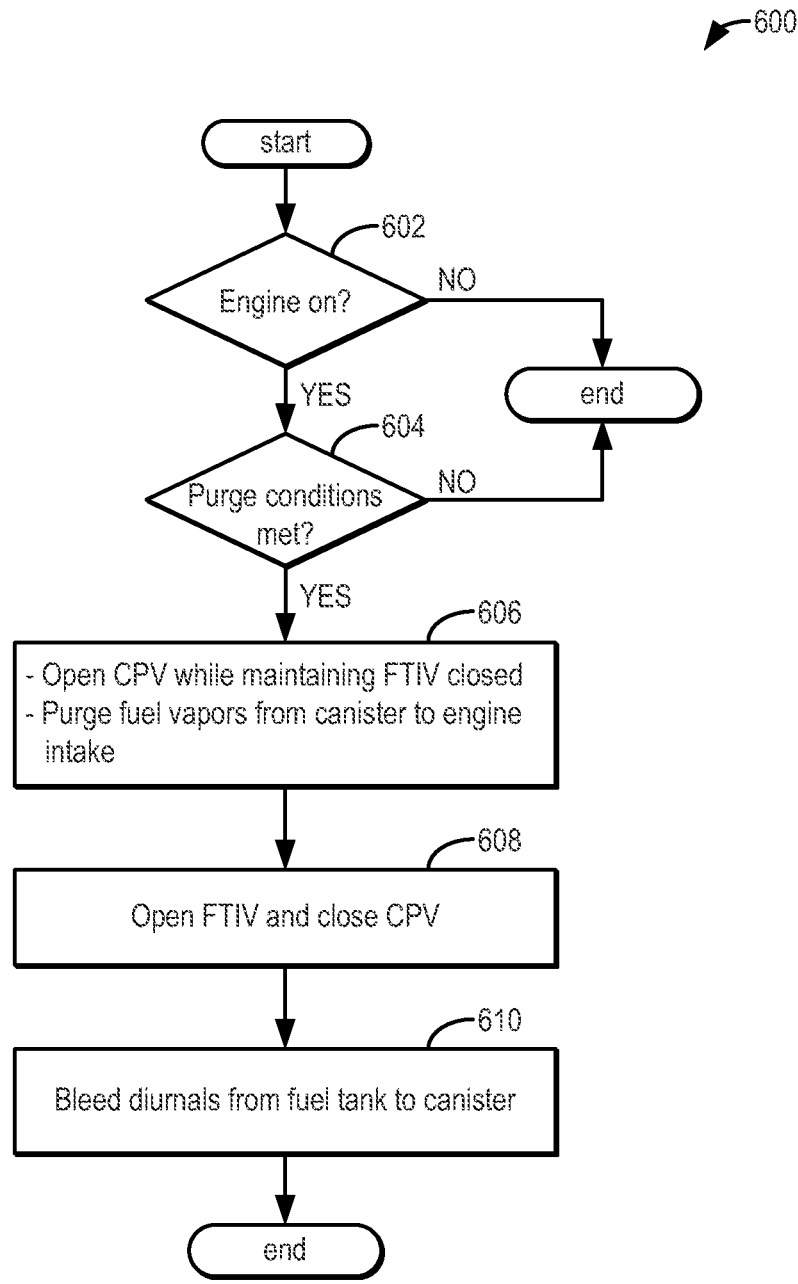
FIG. 6 shows a high level flow chart illustrating a purge routine for the fuel vapor recovery system of FIG. 1.

Now turning to FIG. 6, an example routine 600 is described for purging a canister of the fuel vapor recovery system of FIG. 1. As such, the purging routine of FIG. 6 may be performed during an engine-on cycle when purge conditions have been confirmed.

At 602, engine-on conditions may be confirmed. At 604, purge conditions may be confirmed including, for example, confirming that an amount of fuel vapors stored in the canister is higher than a threshold, a temperature of the emission control device is higher than a threshold, and/or a number of starts since a last purge cycle is higher than a threshold. If the conditions of 602-604 are met, then at 606 the controller may open the canister purge valve and the canister vent valve (for example, by actuating the canister purge valve solenoid and the canister vent valve solenoid) while maintaining the FTIV closed. By opening the purge valve, the intake manifold vacuum may be used to purge fuel vapors from the canister into the engine intake.

As such, various methods may be employed to estimate the quantity of fuel purged from the canister to the engine intake. Based on the purge amount, the engine controller may reduce the fuel supplied by other sources to allow the engine to operate at the desired mixture ratio of fuel and air. One example method is to determine how much fuel flow is reduced by a feedback system employing a sensor in the exhaust system that senses the oxygen concentration in the exhaust stream. The amount of flow through the canister may be limited for a number of reasons. For example, if too much fuel is supplied from the canister, and in spite of compensation made to the supplied fuel, the engine may run with an excessive ratio of fuel to air. The total fuel from the canister system may also be limited to prevent the air fuel ratio from deviating too far from the desired limits in the event that the vehicle operator releases their foot from the accelerator pedal.

Fuel vapors are also introduced into the portion of the canister near the outlet to the engine. The volume of carbon between the fuel tank vent port and the outlet to the engine is considered buffer carbon that will alternately adsorb and desorb the fuel vapors from the tank venting to minimize the variations in the fuel concentration released to the engine. To keep the fuel from the tank from overflowing the buffer volume and loading the remainder of the canister, the fuel tank vent events are limited in the duration of each event and the minimum time between each event is adjusted to allow a significant portion of the fuel vapor trapped in the buffer volume to be purged to the engine.

At 608, after purging the canister, the routine includes closing the canister purge valve (to seal the system from the engine intake) while opening the FTIV for a duration, and at 610, diurnal fuel vapors may be bled from the fuel tank to the canister. As such, the amount of diurnals bled from the fuel tank to the canister may be based on the amount of fuel vapors previously purged (at 606) from the canister to the engine intake. Thus, the duration of FTIV opening may be accordingly adjusted. During a subsequent purge cycle, the diurnal vapors bled to the canister may be purged to the intake. In an alternate embodiment, if purge conditions persist, the routine may return to 606, to purge the fuel vapors to the engine intake.

In this way, a fuel tank isolation valve may be modulated to produce pressure fluctuations across the valve. Based on correlations between the valve modulations and the resultant pressure pulsations, degradation of the isolation valve may be determined. By confirming FTIV functionality on a diurnal cycle preceding a diurnal cycle wherein system leaks are checked, the accuracy of leak detection can be improved and emissions compliance may be better enabled.

Note that the example control and estimation routines included herein can be used with various engine and/or vehicle system configurations. The specific routines described herein may represent one or more of any number of processing strategies such as event-driven, interrupt-driven, multi-tasking, multi-threading, and the like. As such, various acts, operations, or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated acts or functions may be repeatedly performed depending on the particular strategy being used. Further, the described acts may graphically represent code to be programmed into the computer readable storage medium in the engine control system.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method of monitoring a fuel vapor recovery system, comprising,
    modulating a fuel tank isolation valve (FTIV) coupled between a fuel tank and a canister of the fuel vapor recovery system; and
    indicating FTIV degradation based on pressure pulsations upstream and/or downstream of the FTIV responsive to the modulation, the modulation being a periodic modulation at a selected frequency and the indication based on an amplitude of the pressure pulsations at the selected frequency.

2. The method of claim 1, wherein the modulation is performed during an engine-off condition in response to obtaining a threshold pressure difference across the FTIV.

3. The method of claim 2, wherein the indication includes,
    during a first condition when the pressure difference across the FTIV is higher, indicating FTIV degradation based on pressure pulsations only upstream, or only downstream, of the FTIV; and
    during a second condition when the pressure difference across the FTIV is lower, indicating FTIV degradation based on pressure pulsations upstream and downstream of the FTIV.

4. The method of claim 2, wherein the modulation includes intermittently opening the FTIV with a duty cycle based on a bandwidth of the valve, wherein an increased modulation duty cycle is applied during higher pressure differential conditions, and a decreased modulation duty cycle is applied during lower pressure differential conditions.

5. The method of claim 1, wherein the pressure pulsations upstream of the FTIV are estimated by a first pressure sensor coupled to the fuel tank, and wherein the pressure pulsations downstream of the FTIV are estimated by a second pressure sensor coupled to the canister.

6. The method of claim 1, wherein the indication includes, indicating degradation if a frequency ratio of pressure pulses to valve pulses is lower than a threshold.

7. The method of claim 1, wherein the indication includes, filtering the pressure pulsations through a first, band-pass filter and a second, notch filter, and indicating degradation if a difference between an output from the first and second filter is less than a threshold.

8. The method of claim 1, further comprising, in response to FTIV degradation, disabling leak detection in the fuel vapor recovery system for a duration.

9. An emission control system, comprising,
a fuel tank;
a canister configured to store fuel vapors,
a fuel tank isolation valve coupled between the fuel tank and the canister;
a first pressure sensor coupled to the fuel tank to estimate a fuel tank pressure;
a second pressure sensor coupled to the canister to estimate a canister pressure; and
a control system with computer readable instructions for,
during a first engine-off diurnal cycle, when a pressure difference across the valve is greater than a pressure threshold,
modulating the valve (FTIV) with a duty cycle;
indicating valve degradation based on pressure pulsations estimated by the first and/or second pressure sensor responsive to the modulation;
disabling leak detection of the emission control system during a second, subsequent engine-off diurnal cycle in response to an indication of valve degradation; and
enabling leak detection of the emission control system during the second diurnal cycle in response to an indication of no valve degradation, wherein a frequency of the modulation is based on a bandwidth of the valve, and the duty cycle of the modulation is based on the pressure difference across the valve.

10. The system of claim 9, wherein the duty cycle is higher when the pressure difference across the valve is higher, and wherein the duty cycle is lower when the pressure difference across the valve is lower.

11. The system of claim 10, wherein the indication includes, indicating valve degradation responsive to a frequency ratio of the modulation to the pressure pulsations being lower than a threshold.

12. The system of claim 11, wherein the indication includes, indicating valve degradation responsive to a difference between a first output of the pressure pulsations through a first band-pass filter and a second output of the pressure pulsations through a second notch filter being larger than a threshold.

13. The system of claim 12, wherein the control system further includes instructions for, aborting the modulation in response to one of an engine restart request, a refueling request, and a canister purging request.

14. A method of operating a fuel vapor recovery system including a fuel tank coupled to a canister through a fuel tank isolation valve, comprising,
during a first engine-off diurnal cycle, with a pressure difference across the valve being higher than a threshold,
modulating the valve with a duty cycle based on a bandwidth of the valve; and
indicating valve degradation based on pressure pulsations upstream and/or downstream of the valve responsive to the modulation; and
during a second engine-off diurnal cycle, immediately following the first diurnal cycle, performing a leak detection operation if no valve degradation is indicated in the first diurnal cycle.

15. The method of claim 14, further comprising, stopping valve modulation in response to one or more of an engine restart request and a canister purge request.

16. The method of claim 14, wherein the pressure pulsations are estimated by a pressure sensor coupled to at least one of the fuel tank and the canister.

17. The method of claim 14, wherein,
during a first condition, the indication is based on a frequency ratio of the pressure pulsations to the valve modulation;
during a second condition, the indication is based on a difference between an output of the pressure pulsations through a band-pass filter and a notch filter; and
during a third condition, the indication is based on each of the frequency ratio and the difference.

* * * * *